2,798,840

PRODUCTION OF VITAMIN B₁₂ BY AGROBACTERIUM RADIOBACTER

Johannes C. Hoogerheide, Whitefish Bay, Wis., assignor to Pabst Brewing Company, Milwaukee, Wis., a corporation of Delaware No Drawing. Application April 28, 1954, Serial No. 426,279

5 Claims. (Cl. 195—96)

This invention relates to the production of vitamin $B_{12}$, more particularly, to a microbial fermentation process for producing vitamin $B_{12}$. The invention is especially concerned with production of vitamin $B_{12}$ by fermentation with a microorganism of the genus Agrobacterium.

It is known that vitamin $B_{12}$ can be produced by fermentation using a variety of organisms and nutritive substances. As an illustration, U. S. Patent No. 2,595,499 discloses a number of classes of organisms and nutrients for the production of vitamin $B_{12}$. U. S. Patent No. 2,561,364 refers, in particular, to the cultivation of *Flavobacterium devorans* in a suitable medium. U. S. Patent No. 2,576,932 discloses the use of *Bacillus megatherium* in a suitable medium.

It has now been discovered that vitamin $B_{12}$ can be produced very advantageously by fermentation of a nutrient medium with a microorganism of the genus Agrobacterium of the family Rhizobiaceae.

Although the active substances produced are evaluated in terms of the equivalent amount of vitamin $B_{12}$ and this terminology will be employed herein, the activity content may include also or in the alternative other compounds having vitamin $B_{12}$ activity, as previously reported, which are meant to be included within the scope of the term.

In the invention, a nutrient medium is fermented with a vitamin $B_{12}$-producing strain of a microorganism of the genus Agrobacterium, preferably under submerged, aerated conditions and preferably also, with agitation. Fermentation is continued until the content of vitamin $B_{12}$-active substances is substantailly maximal, and a vitamin $B_{12}$-active concentrate is recovered from the fermentation product.

Organisms useful in the invention are described on pages 227–231 of Manual of Determinative Bacteriology, Bergey, D. H. et al., (The Williams & Wilkins Company, Baltimore) 1948, 6th ed. Microorganisms which are particularly useful may be characterized by the following common properties. They are non-chromogenic, non-sporulating, small motile rods, are gram-negative and grow aerobically on most ordinary culture media. They all produce heavy slime in media containing carbohydrates. They do not produce gas nor appreciable acid from carbohydrates, nevertheless, such substrates are metabolized completely. Gelatin is not liquified, or only extremely slowly. The methyl red, Voges Proskauer and indole reactions are negative. No appreciable growth is observed on Koser's citrate medium, unless a very heavy inoculum is used. Growth in milk produces a slight serum zone. They are non-pathogenic to plants and fail to produce root nodules on legume species.

Such strains, according to the present classification system of Bergey's manual, come under the genus Agrobacterium and, more specifically, fall within the species *Agrobacterium radiobacter*. Whereas, the description of this species as given in Bergey's manual represents the properties of certain typical standard strains, it is a well recognized fact that there exists a marked variability in the properties of this organism. A few examples may suffice.

Beyerinck, who first isolated and described this species, found that typical strains reduced nitrates and nitrites vigorously with production of gaseous nitrogen. In later years, however, strains were isolated which did not produce nitrogen gas from nitrate. The latter strains are at present recognized as typical in Bergey's manual, contrary to the original description of the species by Beyerinck.

The strains of Agrobacterium of the invention vary in their action on nitrate. Thus, some strains reduce nitrate with the production of nitrogen gas, others form no gas, but utilize all nitrate present as fast as the strains producing gaseous nitrogens, and again, others form nitrite from nitrate with a much slower nitrate reduction rate.

The strains of Agrobacterium useful in the invention also vary markedly in colony form on nutrient media. Some strains give colonies which are mucoid and viscous, while others produce colonies that are dry and rough. Often, the same strain may produce both types on the same nutrient agar, both types being equally good producers of the active substances.

While ability to grow at a pH of 10–11, the formation of hydrogen sulfide as determined by the Zobell method, browning on mannitol-calcium glycerophosphate and growth on Koser's uric acid medium have been described as characteristic of *Agrobacterium radiobacter*, a number of atypical strains do not possess all of these properties. Thus, reference to Agrobacterium and to the species *radiobacter* in the specification and claims is meant to include not only organisms having the characteristics given on pages 227–231 of Bergey's manual, but also atypical strains.

Several atypical strains which have characteristics differing in certain details from those given in the reference are further described in the table below. Rather than create new species for these strains, they are considered as atypical strains, not previously described, of the species *Agrobacterium radiobacter*. The table, in which characteristics of eight groups of Agrobacterium species are listed, illustrates the variations encountered by comparing the properties of two typical groups with six atypical groups. All strains in each group have all of the common characteristics of the genus Agrobacterium referred to above, and each produces an appreciable amount of vitamin $B_{12}$, but the atypical strains differ in certain details from standard strains carried in stock collections.

| Strain | ATCC #4718* | 154* | K300 [5] | 382 [5] | 255 | 280 [5] | 263 | 157 |
|---|---|---|---|---|---|---|---|---|
| Colonies on: | | | | | | | | |
| Nutrient agar | Small col. no slime. | Same | Large col. mucoid.[3] | Same [3] | Small col. no slime. | Large col. mucoid.[3] | Same | Same. |
| ½% Yeast extract-glucose agar. | Smooth, but not viscous. | Same | Large mucoid col.[3] | Same [3] | Mucoid | Large mucoid col. | Same | Same. |
| Glycerol-agar [7] | Viscous slimy | White butyrous slimy. | Same [3] | Same | Smooth scant growth. | Same | Viscous slimy transparent. | Same but also butyrous col. |
| Ca-glycero-phosphate agar [7] | White butyrous iridescent. | Same [1] | Transparent mucoid.[6] | White butyrous iridescent. | Same [1] | Transparent mucoid. | White butyrous iridescent. | Transparent mucoid. |
| Rose bengal agar | Viscous slimy red col. | Semi-viscous red col. | Viscous transparent col., no color absorption. | Same | No growth | Same | Small viscous colonies. | Tiny transparent col. (red). |
| Action on Nitrate: | | | | | | | | |
| Nitrogen gas production | − | − | + | + | − | − | − | +. |
| Nitrite formation | − | +[2] | ± | − | + | + | − | +. |
| Nitrate utilized fast (less than 5–7 days). | yes | no [2] | yes | yes | no | yes | yes | no. |
| Growth on Koser's: | | | | | | | | |
| Uric acid medium [8] | ++(pellicle) | same | − | +(only after prolonged incubation). | + | − | ± | −. |
| H₂S Production [8] (Zobell's method). | +++ | ++ | −[4] | + | − | −[4] | − | No growth. |
| Growth with heavy pellicle on most liquid nutrient media. | ++ | same | −to+ | ++ | +(ring only). | | +(ring only). | −. |
| Growth at pH=10.5 [7] | + | same | − | + | − | − | ± | −. |
| Growth at pH=9.5 (6 days incubation). | + | same | same | same | + | − | + | −. |

*Strains ATCC #4718 and #154 represent typical strains of *Agrobacterium radiobacter*. Strain ATCC #4718 is a strain of the species present in the American Type Culture Collection under No. 4718. Strain #154 is an isolate from soil.

[1] Some strains, otherwise identical, grow in colonies that are smooth but not viscous with a slight brown pigment excreted; others give transparent mucoid colonies.
[2] Some strains, otherwise identical with #154, produce no nitrite and utilize nitrate much faster.
[3] The same strain is often mixed with a variant, producing small non-viscous colonies.
[4] Sometimes a slight trace of H₂S is produced; some strains, otherwise identical with K300, fail to grow in this media.
[5] A phage which lysis strain K300 also lysis strains #382 and #280, proving the close kinship of these strains. Strains K300 and #382 seem to have the properties of *A. radiobacter* as described originally by Beyerinck.
[6] Relatively poor growth except with heavy inoculum.
[7] For composition of these media, see Hofer, J. Bact. 41, 193 (1941).
[8] Method as recommended in Manual of Methods for pure culture study of bacteria (Soc. Am. Bacteriologists).

A number of strains of Agrobacterium are available in the recognized culture collections. They may also be isolated from soil, for example, employing the Budinov-Bystryi technique (Mikrobiologiia, 10, 247–249, 1941), the method described by Smith (J. Bact. 15, 20, 1928), or similar methods. The strains are identified as described above and tested for production of vitamin $B_{12}$-active substances. As is usually the case in microbial synthesis, not every strain of a given organism will produce vitamin $B_{12}$-active substances and the quantities produced will vary, so that it is necessary to select a vitamin $B_{12}$-producing strain, employing standard procedures and assay methods.

The fermentation medium may have the usual components employed for this purpose, i. e., a source of assimilable nitrogen, such as a proteinaceous substance, a source of assimilable carbon, such as a carbohydrate, and trace elements, particularly cobalt. Among the proteinaceous and carbohydrate materials which can be used are yeast extracts, casein digests, meat extracts, steep liquors, distillers solubles, soya, glucose, sucrose, molasses and a great variety of similar substances. Suitable media are illustrated in the patents previously referred to.

A source of cobalt providing an addition of about 0.1 to 20 parts per million of cobalt to the nutrient medium is preferably incorporated in the medium as described in U. S. Patent No. 2,595,499. It is further preferred to supply the cobalt in the form of a cobalt salt soluble in the medium, such as cobalt nitrate, cobalt sulfate and the like, although it may be supplied in other forms.

The pH of the fermentation is preferably within the range of about 6.5 to 8.2, the optimum usually being about 7.5. The pH may be controlled by adding dextrose, sucrose or similar substances, by the addition of mineral acids or by adding ammonium hydroxide. If the pH is allowed to become too high, the higher alkalinity tends to decompose the desired end product or prevent its formation and thereby decrease the yield. If the pH is allowed to become too low, the growth of the organism is inhibited, and the yield of the desired end product is thereby reduced.

Fermentation is advantageously carried out at a temperature of about 25–30° C., preferably about 28° C. The inoculated medium is agitated and aerated, and fermentation is allowed to proceed until the optimum, usually the maximum, vitamin $B_{12}$ production is achieved.

The fermentation product is then treated to produce a concentrate of vitamin $B_{12}$. Various methods for concentrating vitamin $B_{12}$ are known to the art, several being described in the patents previously identified. For example, liquid may be removed from the fermentation broth by evaporation, which may be preceded by filtration. Or the broth may be filtered and contacted with activated charcoal or fuller's earth to adsorb the active substances thereon. The resulting vitamin $B_{12}$-active concentrates are useful as animal feed supplements. Also, further concentration may be effected, such as by elution from the adsorbent and concentration of the eluate, followed by further purification if desired.

The following examples are furnished to assist in providing a complete understanding of the invention, but it is to be understood that the invention is not limited thereto nor to the specific ingredients, proportions and procedures set forth therein, which are given only for purposes of illustration.

*Example 1*

Media were prepared containing 1% meat extract, 1% corn steep solids, 1% dextrose, 3% sucrose and 15 p. p. m. of cobalt as $CoSO_4 \cdot 7H_2O$. Forty-milliliter portions of these media were adjusted to pH 7.5 and placed in 250 ml. Erlenmeyer flasks. The flasks and their contents were sterilized for 15 minutes at 121° C. After sterilization, the flasks were cooled and the contents inoculated with 2 ml. from a 24 hour liquid culture of an Agrobacterium species.

The inoculated flasks were incubated at 28° C. for four days on a rotary shaker, fermentation thus being carried out under submerged, agitated and aerated conditions. Upon completion of the incubation period, the vitamin $B_{12}$ content of the fermentation broths was determined by a modification of the proposed USP method (U. S. Pharm., XIV, third suppl., 15–19) using *Lactobacillus leichmannii* ATCC 7830 as the test organism. The average vitamin $B_{12}$ content of the broths was found to be 0.81 micrograms per gram of broth.

*Example 2*

The procedure of Example 1 was repeated, except that the flask contents were inoculated with 2 ml. from a 24 hour culture of Agrobacterium variant K300. The average vitamin $B_{12}$ content of the fermentation broths was 0.715 microgram per gram of broth.

For the production of a vitamin $B_{12}$ concentrate, the pH of the fermentation broth may be adjusted to pH 4.5–5.0 by addition of hydrochloric acid. The fermentation broth is heated to about 70° C. for 15 minutes, in order to liberate the vitamin from the cells. The culture, thus treated, may now be concentrated under vacuum and drum dried, or it may first be filtered for removal of cell debris, then concentrated under vacuum and drum dried.

*Example 3*

The procedure of Example 1 was replaced except that the medium used had the following composition: 3% cornsteep liquor solids, 1½% dextrose and 15 p. p. m. of cobalt as $CoSO_4.7H_2O$. The culture was inoculated with 2 ml. of a 24 hour culture of Agrobacterium variant K300 and incubated at 28° C. for four days on a rotary shaker. The vitamin $B_{12}$ content of the fermentation broth at the end of the fermentation period was found to be 1.85 micrograms per gram of broth.

*Example 4*

The procedure of Example 3 was repeated, except that the flask contents were inoculated with 2 ml. of a 24 hour culture of *Agrobacterium radiobacter* A. T. C. C. 4718, a strain maintained in the collection of the American Type Culture Collection. The average vitamin $B_{12}$ content of the fermentation broths was 0.75 microgram per gram of broth.

*Example 5*

The procedure of Example 3 was repeated, except that the flask contents were inoculated with 2 ml. of 24 hour cultures of strains #154, #382, #255 and #263, respectively. Strain #154 is a typical strain of *Agrobacterium radiobacter*, isolated from soil, whereas strains #382, #255 and #263 are atypical strains of this species. The average vitamin $B_{12}$ content per gram of broth of the fermentation broths after 4 days incubation was as follows: 0.6 microgram $B_{12}$ for strain #154, 1.5 microgram $B_{12}$ for strain #382, 1.05 microgram $B_{12}$ for strain #255 and 2.1 microgram $B_{12}$ for strain #263.

*Example 6*

The procedure of Example 1 was repeated except that the medium used had the following composition: 3% cornsteep liquor, 1½% dextrose, 1% meat extract and 15 p. p. m. of cobalt as $CoSO_4.7H_2O$. The culture medium was inoculated with 2 ml. of 24 hour cultures of Agrobacterium variants #255, #382 and K300, respectively. The average vitamin $B_{12}$ content per gram of broth of the fermentation broths was 1.2 micrograms for strain #255, 1.5 micrograms for strain #382 and 1.9 micrograms for strain K300.

The invention thus provides a very advantageous process for producing vitamin $B_{12}$ in good yields, increasing its availability and serving to meet the large demand for the vitamin for nutritional and therapeutic purposes.

The invention is hereby claimed as follows:

1. The process which comprises fermenting a nutrient medium with a vitamin $B_{12}$-producing strain of *Agrobacterium radiobacter* under submerged aerated conditions.

2. The process which comprises fermenting a nutrient medium with a vitamin $B_{12}$-producing strain of *Agrobacterium radiobacter* until the vitamin $B_{12}$ content is substantially maximal.

3. The process which comprises fermenting a nutrient medium containing a source of assimilable nitrogen, a source of assimilable carbon and a source of cobalt with a vitamin $B_{12}$-producing strain of *Agrobacterium radiobacter*.

4. The process which comprises fermenting a nutrient medium with a vitamin $B_{12}$-producing strain of *Agrobacterium radiobacter* to produce a fermentation product containing vitamin $B_{12}$.

5. The process which comprises fermenting a nutrient medium with a vitamin $B_{12}$-producing strain of *Agrobacterium radiobacter*, and producing a concentrate of vitamin $B_{12}$ from the fermentation product.

References Cited in the file of this patent

UNITED STATES PATENTS

| | | |
|---|---|---|
| 2,595,499 | Wood et al. | May 6, 1952 |
| 2,703,302 | Rickes | Mar. 1, 1955 |

OTHER REFERENCES

Ann. Review of Microbiology 7, 1953, p. 447, QR–41–A7 Sci. Lib.